United States Patent [19]

Matzner et al.

[11] Patent Number: 4,668,744

[45] Date of Patent: May 26, 1987

[54] NOVEL POLY(ARYL ETHER KETONE) POLYESTER BLOCK COPOLYMERS

[75] Inventors: Markus Matzner, Edison, N.J.; Donald M. Papuga, Danbury, Conn.

[73] Assignee: Amoco Corporation, Chicago, Ill.

[21] Appl. No.: 787,122

[22] Filed: Oct. 15, 1985

[51] Int. Cl.[4] .................... C08L 61/18; C08L 71/04
[52] U.S. Cl. ................................. 525/397; 525/418; 525/419; 525/471; 528/125; 528/126; 528/128
[58] Field of Search ............. 525/397, 437, 471, 418, 525/419; 528/125, 128, 126

[56] References Cited

U.S. PATENT DOCUMENTS 4,083,829  4/1978  Calundann .................... 528/176
4,386,174  5/1983  Cogswell ........................ 524/27
4,414,365  11/1983  Sugimoto ....................... 525/437

*Primary Examiner*—John C. Bleutge
*Assistant Examiner*—Patricia A. Short
*Attorney, Agent, or Firm*—Donald M. Papuga; William H. Magidson; Ralph C. Medhurst

[57] ABSTRACT

Described herein are novel block copolymers wherein one block is a poly(aryl ether ketone) oligomer and the other block is a liquid crystalline polyester oligomer. Processes for the preparation of the subject copolymers are also described. The novel block copolymers display excellent mechanical properties, good high temperatures stability and excellent solvent and chemical resistance.

24 Claims, No Drawings

NOVEL POLY(ARYL ETHER KETONE) POLYESTER BLOCK COPOLYMERS

FIELD OF THE INVENTION

This invention is directed to novel block copolymers wherein one block is a poly(aryl ether ketone) oligomer and the other block is a liquid crystalline polyester oligomer. Processes for the preparation of the subject copolymers are also described. The novel block copolymers display excellent mechanical properties, outstanding high temperature stability, excellent solvent and chemical resistance, and a remarkably easy melt-fabricability.

BACKGROUND OF THE INVENTION

Poly(aryl ether ketone)s are a known class of engineering polymers. Several poly(aryl ether ketone)s are highly crystalline with melting points above 300° C. Two of these crystalline poly(aryl ketone)s are commercially available and are of the following structure:

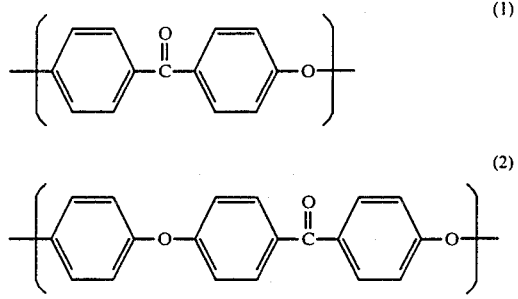

Over the years, there has been developed a substantial body of patent and other literature directed to the formation and properties of poly(aryl ethers) (hereinafter called "PAE"). Some of the earliest work such as by Bonner, U.S. Pat. No. 3,065,205, involves the electrophilic aromatic substitution (viz. Friedel-Crafts catalyzed) reaction of aromatic diacylhalides with unsubstituted aromatic compounds such as diphenyl ether. The evolution of this class to a much broader range of PAEs was achieved by Johnson et al., Journal of Polymer Science, A-1, vol. 5, 1967, pp. 2415-2427, Johnson et al., U.S. Pat. Nos. 4,108,837, and 4,175,175. Johnson et al. show that a very broad range of PAEs can be formed by the nucleophilic aromatic substitution (condensation) reaction of an activated aromatic dihalide and an aromatic diol. By this method, Johnson et al. created a host of new PAEs including a broad class of poly(aryl ether ketones), hereinafter called "PAEK's".

In recent years, there has developed a growing interest in PAEK's as evidenced by Dahl, U.S. Pat. No. 3,953,400; Dahl et al., U.S. Pat. No. 3,956,240; Dahl, U.S. Pat. No. 4,247,682; Rose et al., U.S. Pat. No. 4,320,224; Maresca, U.S. Pat. No. 4,339,568; Attwood et al., Polymer, 1981, vol 22, August, pp. 1096-1103; Blundell et al., Polymer, 1983 vol. 24, August, pp. 953-958, Attwood et al., Polymer Preprints, 20, No. 1, April 1979, pp. 191-194; and Rueda et al., Polymer Communications, 1983, vol. 24, September, pp. 258-260. In early to mid-1970, Raychem Corp. commercially introduced a PAEK called STILAN TM, a polymer whose acronym is PEK, each ether and keto group being separated by 1,4-phenylene units. In 1978, Imperial Chemical Industries PLC (ICI) commercialized a PAEK under the trademark Victrex PEEK. As PAEK is the acronym of poly(aryl ether ketone), PEEK is the acronym of poly(ether ether ketone) in which the phenylene units in the structure are assumed.

Thus, PAEK's are well known; they can be synthesized from a variety of starting materials; and they can be made with different melting temperatures and molecular weights. The PAEK's are crystalline, and as shown by the Dahl and Dahl et al. patents, supra, at sufficiently high molecular weights they can be tough, i.e., they exhibit high values (>50 ft-lbs/in$^2$) in the tensile impact test (ASTM D-1822). They have potential for a wide variety of uses, but because of the significant cost to manufacture them, they are expensive polymers. Their favorable properties class them in the upper bracket of engineering polymers.

PAEK's may be produced by the Friedel-Crafts catalyzed reaction of aromatic diacylhalides with unsubstituted aromatic compounds such as diphenyl ether as described in, for example, U.S. Pat. No. 3,065,205. These processes are generally inexpensive processes; however, the polymers produced by these processes have been stated by Dahl et al., supra, to be brittle and thermally unstable. The Dahl patents, supra, allegedly depict more expensive processes for making superior PAEK's by Friedel-Crafts catalysis. In contrast, PAEK's such as PEEK made by nucleophilic aromatic substitution reactions are produced from expensive starting fluoro monomers, and thus would be classed as expensive polymers.

These poly(aryl ether ketone)s exhibit an excellent combination of properties; i.e., thermal and hydrolytic stability, high strength and toughness, wear and abrasion resistance and solvent resistance. Thus, articles molded from poly(aryl ether ketones) have utility where high performance is required. However, in some applications where articles having a complex shape are sought fabrication difficulties arise due to the high melt viscosity of the poly(aryl ether ketones).

The liquid crystalline aromatic polyesters which may be used herein are well known from the art. These liquid crystalline polyesters are described in, for example, U.S. Pat. Nos. 3,804,805; 3,637,595; 4,130,545; 4,161,470; 4,230,817, and 4,265,802. The materials are characterized in that they exhibit optical anisotropy in the melt phase. Liquid crystalline polyesters are ordered, high strength materials, having very good high temperature properties; they are characterized by a relatively low melt viscosity and are particularly suitable for high strength fibers and filaments. Due to their high crystalinity their solvent and chemical resistance are excellent. Their main drawback as molding materials resides in the anisotropy of properties displayed by molded parts. Liquid crystalline polyesters were reviewed several times, see, for example, W. J. Jackson, Jr. Journal of Applied Polymer Science, Applied Polymer symposium 41, 25-33(1985).

THE INVENTION

The present invention is directed to novel block copolymers of poly(aryl ether ketones) and liquid crystalline polyesters. Processes for the preparation of the subject copolymers are also described. Due to the highly crystalline nature of the constituent blocks, the copolymeric materials of the instant invention are phase separated. The poly(aryl ether ketone) rich products are thus a crystalline poly(aryl ether ketone) matrix that contains dispersed in it, and chemically bound to it, the highly oriented crystalline domains of the polyester. The materials are essentially molecular composites which show improved mechanical properties. An important mechanical property advantage is the fact that molded parts are significantly less anisotropic than those obtained from the unmodified polyesters. Good solvent and chemical resistance are also observed. Most important, however, is the fact that the block copolymers have a relatively low melt-viscosity and are quite easy to melt-fabricate. On the other end of the compositional spectrum, i.e., for the polyester-rich block polymers, the anisotropy of the molded parts is also decreased, though to a lesser extent. The mechanical properties are very good, and so are also the solvent and chemical resistance, and the melt-fabricability. Finally, the block copolymers retain the favorable high temperature characteristics of the constituent blocks. The block polymers have the general structure $(AB)_n$ wherein A and B are oligomers of the poly(aryl ether ketone) and of the liquid crystalline polyester, respectively; and wherein n is 1 or greater. The block copolymers may also have the structure $(ABC)_n$ and $(ABCD)_n$, wherein A, B, and n are as defined above, and C and D are poly(aryl ether ketone) and liquid crystalline polyester blocks, different from the blocks A and B.

Due to the chemical bond between the blocks, the overall properties are superior to those displayed by the corresponding blends.

The crystalline poly(aryl ether ketone) oligomers which are suitable for use herein can be generically characterized as containing repeating units of one or more of the following formulae:

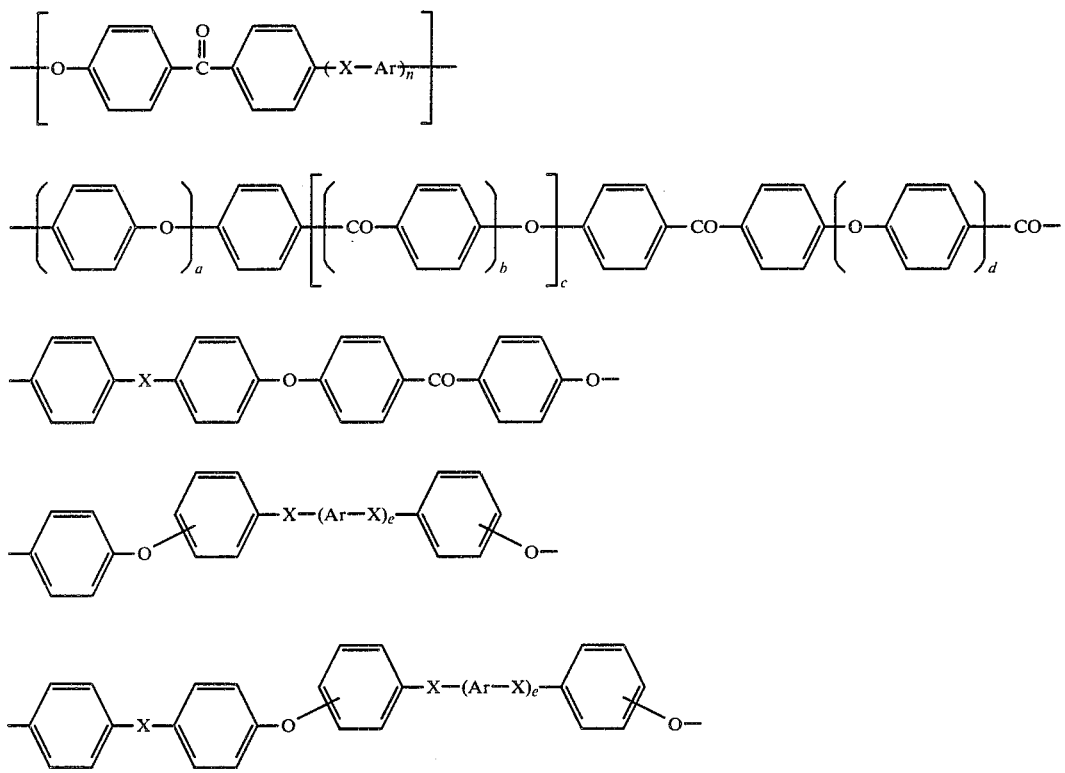

wherein Ar is independently a divalent aromatic radical selected from phenylene, biphenylene or naphthylene, X is independently O,

or a direct bond and n is an integer of from 0 to 3, b, c, d and e are 0 to 1 and a is an integer of 1 to 4 and preferably d is 0 when b is 1.

Preferred poly(aryl ketone)s include those having a repeating unit of the formula:

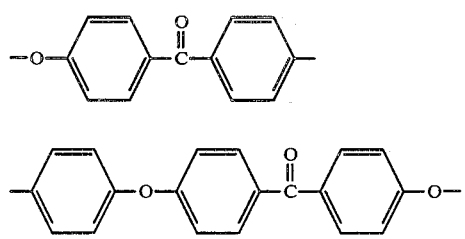

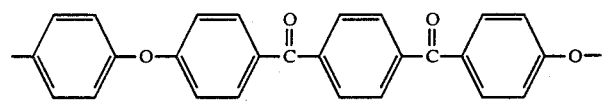
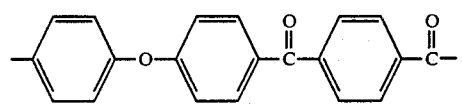
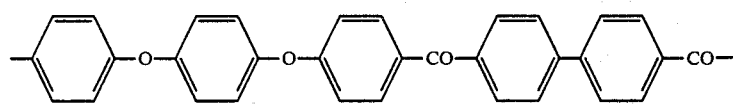
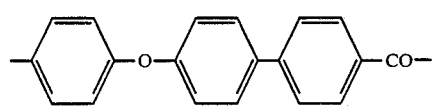
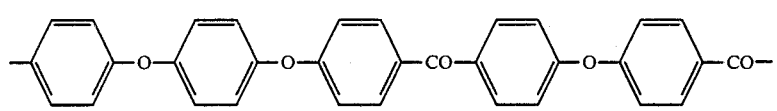
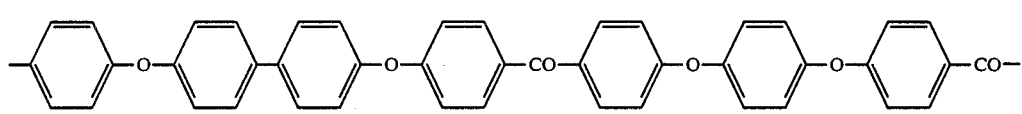
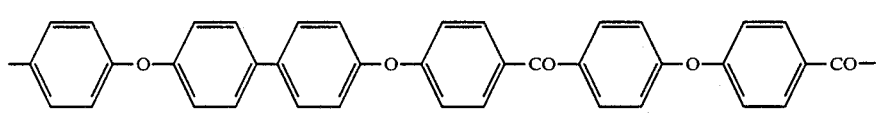
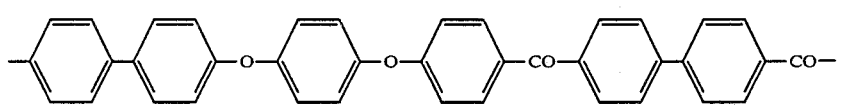
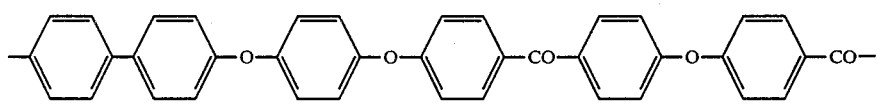
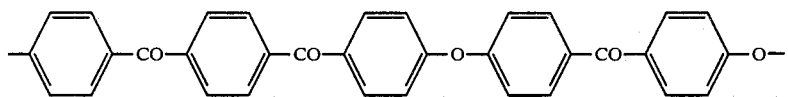
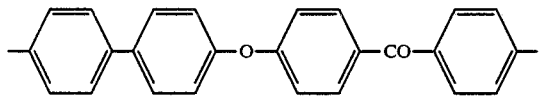
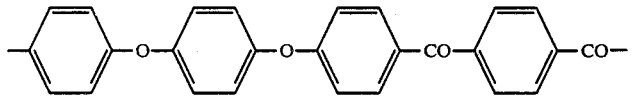
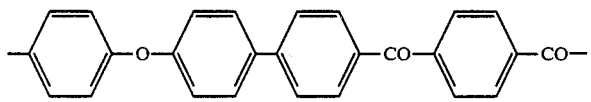

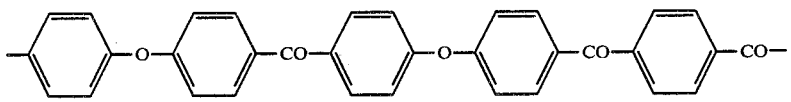

These poly(aryl ketone) oligomers are prepared by methods well known in the art. One such method comprises heating an excess of at least one bisphenol with at least one dihalobenzoid compound. In another embodiment, a halophenol may be reacted with itself and, after reaching the desired molecular weight, reacted with a slight amount of a bisphenol, to yield a dihydroxy-terminated oligomer.

Preferred bisphenols in such a process include:
hydroquinone,
4,4'-dihydroxybenzophenone,
4,4'-dihydroxybiphenyl, and
4,4'-dihydroxydiphenyl ether.

Preferred dihalo and halophenol compounds include:
4-(4'-chlorobenzoyl)phenol,
4-(4'-fluorobenzoyl)phenol,
4,4'-difluorobenzophenone,
4,4'-dichlorobenzophenone,
4-chloro-4'-fluorobenzophenone,

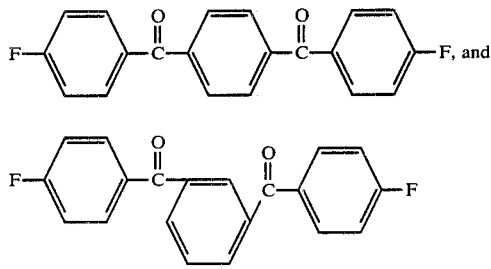

The poly(aryl ketone) oligomers may be produced by the process as described in, for example, U.S. Pat. No. 4,176,222. This process comprises heating in the temperature range of 100° to 400° C., (i) an excess of at least one bisphenol and at least one dihalobenzenoid compound, and/or (ii) at least one halophenol followed by reaction with a small amount of a diphenol in order to ensure hydroxyl termination, in which in the dihalobenzenoid compound or halophenol, the halogen atoms are activated by —CO— groups ortho or para thereto, with a mixture of sodium carbonate or bicarbonate and a second alkali metal carbonate or bicarbonate, the alkali metal of said second alkali metal carbonate or bicarbonate having a higher atomic number than that of sodium, the amount of said second alkali metal carbonate or bicarbonate being such that there are 0.001 to 0.2 gram atoms of said alkali metal of higher atomic number per gram atom of sodium, the total amount of alkali metal carbonate or bicarbonate being such that there is at least one alkali metal atom for each phenol group present, and thereafter separating the oligomer from the alkali metal halide.

The higher alkali metal carbonates or bicarbonates are thus selected from the group consisting of potassium, rubidium and cesium carbonates and bicarbonates. Preferred combinations are sodium carbonate or bicarbonate with potassium carbonate or cesium carbonate.

The alkali metal carbonates or bicarbonates should be anhydrous although, if hydrated salts are employed, where the polymerization temperature is relatively low, e.g., 100° to 250° C., the water should be removed, e.g., by heating under reduced pressure, prior to reaching the polymerization temperatures.

Where high polymerization temperatures (>250° C.) are used, it is not necessary to dehydrate the carbonate or bicarbonate first as any water is driven off rapidly before it can adversely affect the course of the polymerization reaction.

The total amount of alkali metal carbonate or bicarbonate employed should be such that there is at least 1 atom of alkali metal for each phenol group. Hence, there should be at least 1 mole of carbonate, or 2 moles of bicarbonate, per mole of the aromatic diol.

An excess of carbonate or bicarbonate may be employed. Hence there may be 1 to 1.2 atoms of alkali metal per phenol group. While the use of an excess of carbonate or bicarbonate may give rise to faster reactions, there is the attendant risk of cleavage of the resulting polymer, particularly when using high temperatures and/or the more active carbonates.

As stated above the amount of the second (higher) alkali metal carbonate or bicarbonate employed is such that there are 0.001 to about 0.2 gram atoms of the alkali metal of higher atomic number per gram atom of sodium.

Thus when using a mixture of carbonates, e.g., sodium carbonate and cesium carbonate, there should be 0.1 to about 20 moles of cesium carbonate per 100 moles of sodium carbonate. Likewise when using a mixture of a bicarbonate and a carbonate, e.g., sodium bicarbonate and potassium carbonate, there should be 0.05 to 10 moles of potassium carbonate per 100 moles of sodium bicarbonate.

A mixed carbonate, for example sodium and potassium carbonate, may be employed as the second alkali metal carbonate. In this case, where one of the alkali metal atoms of the mixed carbonate is sodium, the amount of sodium in the mixed carbonate should be added to that in the sodium carbonate when determining the amount of the mixed carbonate to be employed.

Preferably, from 0.005 to 0.1 gram atoms of the alkali metal of the second alkali metal carbonate or bicarbonate per gram atom of sodium is used.

The reaction is carried out in the presence of an inert solvent.

Preferably the solvent employed is an aliphatic or aromatic sulfoxide or sulfone of the formula

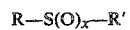

where x is 1 or 2 and R and R' are alkyl or aryl groups and may be the same or different. R and R' may together form a divalent radical. Preferred solvents include dimethyl sulfoxide, dimethyl sulfone, sulfolane (1,1 dioxothiolan), or aromatic sulfones of the formula:

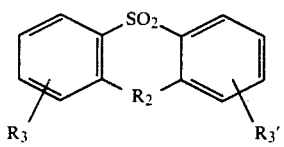

where R$_2$ is a direct link, an oxygen atom or two hydrogen atoms (one attached to each benzene ring) and R$_3$ and R'$_3$, which may be the same or different, are hydrogen atoms and alkyl or phenyl groups. Examples of such aromatic sulfones include diphenylsulfone, dibenzothiophen dioxide, phenoxathin dioxide and 4-phenylsulfonyl biphenyl. Diphenylsulfone is the preferred solvent.

The polymerization temperature is in the range of from about 100° to about 400° C. and will depend on the nature of the reactants and the solvent, if any, employed. The preferred temperature is above 270° C. The reactions are generally performed under atmospheric pressure. However, higher or lower pressures may be used.

For the production of some oligomers, it may be desirable to commence polymerization at one temperature, e.g., between 200° and 250° C. and to increase the temperature as polymerization ensues. This is particularly necessary when making oligomers having only a low solubility in the solvent. Thus, it is desirable to increase the temperature progressively to maintain the oligomer in solution as its molecular weight increases.

To minimize cleavage reactions it is preferred that the maximum polymerization temperature be below 350° C.

This invention is also directed to an improved process for making the oligomers in comparatively shorter reaction times overall than by using potassium fluoride alone or by using a combination of sodium carbonate or bicarbonate and a second higher alkali metal carbonate or bicarbonate.

Specifically, this process is directed to preparing the poly(aryl ether ketone) precursors by the reaction of a mixture of an excess of the diphenol and of the aromatic activated dihalo compound in the presence of a combination of sodium carbonate and/or bicarbonate an alkali metal halide selected from potassium, rubidium, or cesium fluoride or chloride, or combinations thereof.

The reaction is carried out by heating a mixture of the reactants as described herein, at a temperature of from about 100° to about 400° C. The reaction is conducted in the presence of added sodium carbonate and/or bicarbonate and potassium, rubidium or cesium fluorides or chlorides. The sodium carbonate or bicarbonate and the chloride and fluoride salts should be anhydrous although, if hydrated salts are employed, where the reaction temperature is relatively low, e.g., 100° to 250° C., the water should be removed, e.g., by heating under reduced pressure, prior to reaching the reaction temperature.

Where high reaction temperatures (>250° C.) are used, it is not necessary to dehydrate the carbonate or bicarbonate first as any water is driven off rapidly before it can adversely affect the course of the reaction. Optionally, an entraining organic medium can be used to remove water from the reaction such as toluene, xylene, chlorobenzene, and the like.

The total amount of sodium carbonate or bicarbonate and potassium, rubidium or cesium fluoride or chloride, or combinations thereof employed should be such that there is at least 1 atom of total alkali metal for each phenol group, regardless of the anion (carbonate, bicarbonate or halide).

Preferably, from about 1 to about 1.2 atoms of sodium for each phenol group is used. In another preferred embodiment from 0.001 to about 0.5 atoms of alkali metal (derived from a higher alkali metal halide) is used for each phenol group.

The sodium carbonate or bicarbonate and potassium fluoride are used such that the ratio of potassium to sodium therein is from about 0.001 to about 0.5, preferably from about 0.01 to about 0.25, and most preferably from about 0.02 to about 0.20.

An excess of total alkali metal may be employed. Hence there may be about 1 to about 1.7 atoms of alkali metal per phenol group. While the use of a large excess of alkali metal may give rise to faster reactions, there is the attendant risk of cleavage of the resulting polymer, particularly when using high temperatures and/or the more active alkali metal salts. Of course it is well known to those skilled in the art that cesium is a more active metal and potassium is a less active metal so that less cesium and more potassium are used. Further, the chloride salts are less active than the fluoride salts so that more chloride and less fluoride is used.

The reactions are carried out in the presence of an inert solvent.

The reaction temperature is in the range of from about 100° to about 400° C. and will depend on the nature of the reactants and the solvent. The preferred temperature is above 250° C. The reactions are preferably carried out at ambient pressure. However, higher or lower pressure can also be used. The reaction is generally carried out in an inert atmosphere.

For the production of some oligomers it may be desirable to commence reaction at one temperature, e.g., between 200° and 250° C. and to increase the temperature as reaction ensues. This is particularly necessary when making higher molecular weight oligomers having only a low solubility in the solvent. Thus, there it is desirable to increase the temperatures progressively to maintain the oligomer in solution as its molecular weight increases.

Also, poly(aryl ketone) oligomers such as those containing repeating units of the formula:

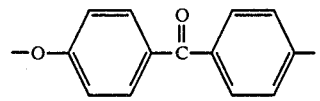

may be produced by Friedel-Craft reactions utilizing hydrogen fluoride-boron trifluoride catalysts as described, for example, in U.S. Pat. No. 3,953,400.

Additionally, poly(aryl ketone) oligomers of the following formula:

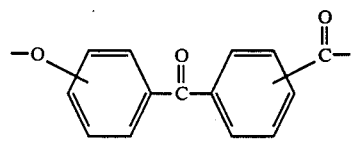

may be prepared by Friedel-Craft reactions using a boron fluoride-hydrogen fluoride catalyst as described in, for example, U.S. Pat. Nos. 3,441,538; 3,442,857 and 3,516,966.

Additionally, the oligomers may be prepared by Friedel-Crafts processes as described in, for example, U.S. Pat. Nos. 3,065,205; 3,419,462; 3,441,538; 3,442,857; 3,516,966; and 3,666,612. In these patents a PAEK is produced by Friedel-Crafts polymerization techniques using Friedel-Crafts catalysts such as aluminum trichloride, zinc chloride, ferric bromide, antimony pentachloride, titanium tetrachloride, etc. and a solvent.

The polyketone oligomers may also be prepared according to the process as described in, for example, U.S. Defensive Publication T 103,703 and U. S. Pat. No. 4,396,755. In such processes, reactants such as (a) an aromatic monocarboxylic acid, (b) a mixture of at least one aromatic dicarboxylic acid, and an aromatic hydrocarbon, and (c) combinations of (a) and (b) are reacted in the presence of a fluoroalkane sulphonic acid, particularly trifluoromethane sulphonic acid.

Additionally, poly(aryl ether ketone) oligomers of the following formulas:

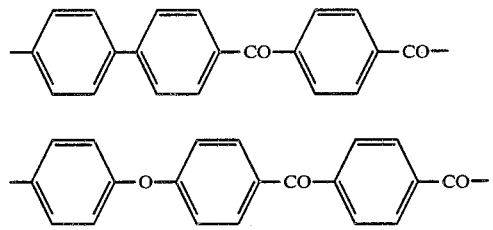

may also be prepared according to the process as described in, for example, U.S. Pat. No. 4,398,020.

In such a process,
(a) a mixture of
(i) at least one aromatic diacyl halide of the formula:

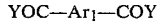

where —Ar$_1$— is a divalent aromatic radical, Y is halogen and COY is an aromatically bound acyl halide group, which diacyl halide is polymerizable with at least one aromatic compound of (a)(ii), and
(ii) at least one aromatic compound of the formula:

wherein —Ar$_2$— is a divalent aromatic radical and H is an aromatically bound hydrogen atom, which compound is polymerizable with at least one diacyl halide of (a)(i), or
(b) at least one aromatic monoacyl halide of the formula:

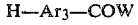

where —Ar$_3$— is a divalent aromatic radical and H is an aromatically bound hydrogen atom, W is halogen, and COW is an aromatically bound acyl halide group, which monoacyl halide is self-polymerizable, or
(c) a combination of (a) and (b) is reacted in the presence of a fluoroalkane sulphonic acid.

In order to obtain oligomers having the desired dihydroxyl termination, appropriate capping agents must be used in the Friedel-Crafts catalyzed reactions described above. This can be accomplished as shown.

VARIANT 1.

In this variant, a diacid dihalide, is polycondensed with a hydrocarbon reactant. An excess of the dihalide is used; reaction of the acid halide-terminated

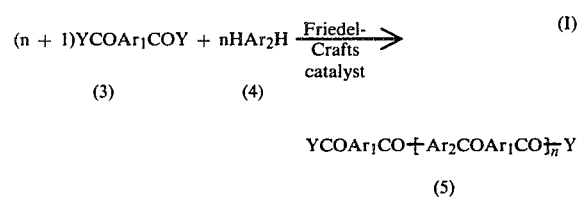

intermediate (5) with a halohydrocarbon (6), followed by hydrolysis, yields the desired dihydroxy poly(aryl ether ketone) oligomer (8).

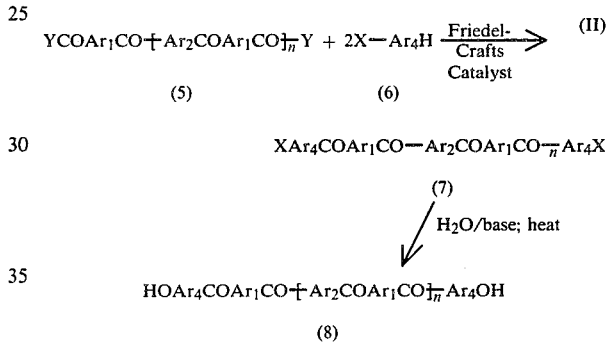

In the above equations Y, Ar$_1$ and Ar$_2$ are as defined above. The group Ar$_4$ is a divalent aromatic radical, preferably paraphenylene; X is halogen, preferably chlorine or fluorine. Other preferred halohydrocarbons (6) are those represented by the formulae (9)–(11).

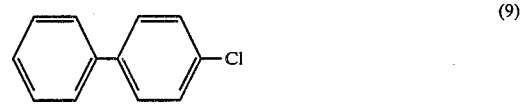

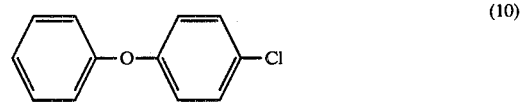

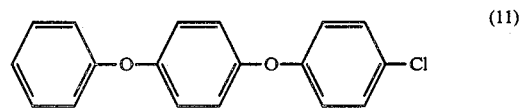

VARIANT 2.

In this variant an excess of hydrocarbon is condensed with the diacids halide. The intermediate (12) is then reacted with a halo-substituted monoacid halide (13) to give a halo-terminated oligomer (14). Hydrolysis of the latter leads to the desired dihydroxy-

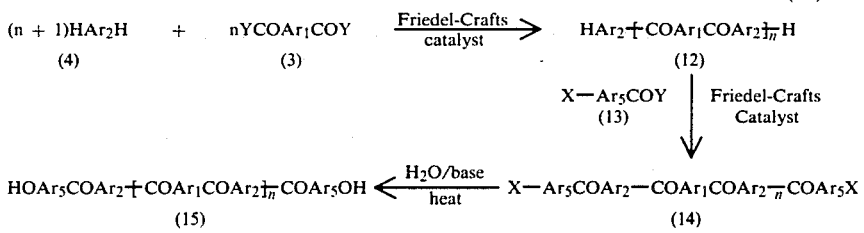

terminated poly(aryl ether ketone) oligomer (15).

In the above equations X, Y, $Ar_1$ and $Ar_2$ are as defined above; $Ar_5$ is a divalent aromatic radical, preferably p-phenylene. Other preferred X—$Ar_5$ COY are for example (16) and (17).

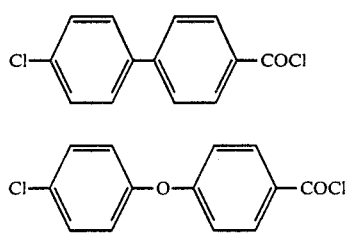

VARIANT 3.

In this variant an aromatic monoacyl halide is polymerized in the presence of a Friedel-Crafts catalyst to the oligomer stage (19). The oligomer (19) is then end-capped

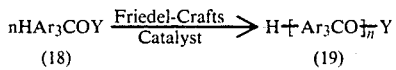

by both $XAr_4H$ and $XAr_5COY$ as shown:

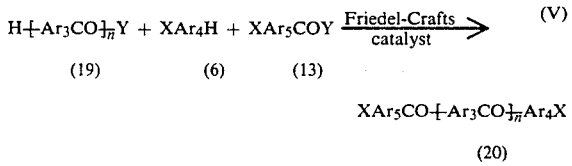

Hydrolysis of (20) yields the dihydroxy-terminated poly(aryl ether ketone) oligomer (21).

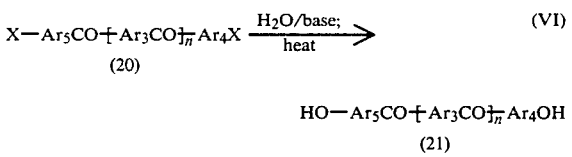

In the above equations $Ar_3$, $Ar_4$, $Ar_5$, X, and Y are as defined above.

For all three variants the value of n should be such that the number average molecular weight of the oligomer be at least 500, preferably at least 1,500, and most preferably at least 2,000.

Specifically, the precursor oligomers may be prepared by reacting any of the well-known aromatic co-reactants such as diphenyl sulfide, dibenzofuran, thianthrene, phenoxathin, dibenzodioxine, phenodioxin, diphenylene, 4,4'-diphenoxybiphenyl, xanthone, 2,2'-diphenoxybiphenyl, 1,4-diphenoxybenzene, 1,3-diphenoxybenzene, 1-phenoxynaphthalene, 1,2-diphenoxynaphthalene, diphenoxybenzophenone, diphenoxy dibenzoyl benzene, diphenyl ether, 1,5-diphenoxynaphthalene, and the like. Among these, diphenyl ether, diphenyl, diphenyl methane, 1,4-diphenoxy benzene, and 4,4'-diphenoxy diphenyl ether are preferred.

Similarly, the following compounds are diacyl halides which may be used as reactants: terephthaloyl chloride, isophthaloyl chloride, thio-bis(4,4'-benzoyl chloride), benzophenone-4,4'-di(carbonyl chloride), oxy-bis(3,3'-benzoyl chloride), diphenyl-3,3-'-di(carbonyl chloride), carbonyl-bis(3,3'-benzoyl chloride), sulfonyl-bis(4,4'-benzoyl chloride), sulfonyl-bis(3,3'-benzoyl chloride), sulfonyl-bis(3,4'-benzoyl chloride), thio-bis(3,4'-benzoyl chloride), diphenyl-3,4'-di(carbonyl chloride), oxy-bis[4,4'-(2-chlorobenzoyl chloride)], napthalene-1,6-di(carbonyl chloride), napthalene-,5-di(carbonyl chloride), napthalene-2,6-di(carbonyl chloride), oxy-bis[7,7'-napthalene-2,2'-di(carbonyl chloride)], thio-bis[8,8'-napthalene-1,1-di(carbonyl chloride)], [7,7'-binaphthyl-2,2-di(carbonyl chloride)], diphenyl-4,4'-di(carbonyl chloride), carbonyl-bis[7,7'-naphthalene-2,2'-di(carbonyl chloride)], sulfonyl-bis[6,6'-napthalene-2,2'-di(carbonyl chloride)], dibenzofuran-2,7-di(carbonyl chloride) and the like.

Illustrative of suitable acyldihalides include carbonyl chloride (phosgene), carbonyl bromide, carbonyl fluoride and oxalyol chloride.

Preferably, diphenyl ether and/or diphenoxybenzene are reacted with terephthaloyl chloride and/or phosgene.

As mentioned before, the poly(aryl ether ketone) blocks have number average molecular weights of at least 500, preferably of at least 1,500, and most preferably of at least 2000.

The liquid crystalline polyarylate oligomers which may be used herein are well known in the art. These liquid crystalline polyarylates are described in, for example, U.S. Pat. Nos. 3,804,805; 3,637,595; 4,130,545; 4,161,470; 4,230,817 and 4,265,802. Preferably, the liquid crystalline polyarylates are derived from one or more of the following: p-hydroxy-benzoic acid, m-hydroxy-benzoic acid, terephthalic acid, isophthalic acid, hydroquinone, phenyl hydroquinone, alkyl substituted hydroquinones, halo substituted hydroquinones, 4,4'-dihydroxydiphenyl ether, resorcinol, 4,4'-biphenol, 2,6-naphthalene diol, 2,6-naphthalene dicarboxylic acid, 6-hydroxy-2-naphthoic acid and 2,6-dhydroxy anthraquinone. Two commercially available liquid crystalline copolyesters are Ekonol, a homopolymer of p-hydroxybenzoic acid, and Ekkcel, a copolymer of p-hydroxybenzoic acid, terephthalic and isophthalic acids, and 4,4-'biphenol. Other liquid crystalline polyarylates of interest include the copolyester of p-hydroxybenzoic acid and 6-hydroxy-2-naphthoic acid in a 75/25 molar ratio.

The liquid crystalline polyester oligomers which may be used as a component of the block copolymers of the present invention are often referred to as oligomers of "wholly aromatic polyesters". They comprise at least two recurring moieties which, when combined in the polyester, have been found to form an atypical anisotropic melt phase. The aromatic polyesters are considered to be "wholly" aromatic in the sense that each moiety present in the polyester contributes at least one aromatic ring to the polymer backbone. Recent publications disclosing such polyesters include (a) Belgian Pat. Nos. 828,935 and 828,936, (b) Dutch Pat. No. 7505551, (c) West German Pat. Nos. 2,520,819; 2,520,820 and 2,722,120, (d) Japanese Pat. Nos. 43-223; 2132-116; 3017-692, and 3021-293, (e) U.S. Pat. Nos. 3,991,013; 3,991,014; 4,057,597; 4,066,620; 4,075,262; 4,118,372; 4,156,070; 4,159,365; 4,169,933 4,181,792 and 4,536,562 and (f) U.K. application Ser. No. 2,002,404.

The preferred polyester oligomers are those derived from Ekonol and Ekkcel, those based on p-hydroxybenzoic acid and 6-hydroxy-2-natphthoic acid mentioned above; and also the terephthalate copolyesters of hydroquinone and phenyl hydroquinone as described in U.S. Pat. No. 4,159,365; the copolyester from terephthalic acid, 2,6-naphthalene dicarboxylic acid and phenyl hydroquinone, as described by W. J. Jackson, Jr., Macromolecules, 16 1027 (1983); the copolyester from terephthalic acid, methyl hydroquinone, and meta-hydroxybenzoic acid, see U.S. Pat. No. 4,146,702. Other preferred liquid crystalline polyester oligomers are derived from the materials described in U.S. Pat. Nos. 4,067,852; 4,083,829; 4,130,545; 4,161,470; 4,184,996; 4,238,599; 4,238,598; 4,230,817; 4,224,443; 4,219,461 and in 4,256,624.

The above-described oligomers, in order to be useful in the present invention, must exhibit optical anisotropy in the melt phase. These polyesters readily form liquid crystals in the melt phase and accordingly exhibit a high tendency for the polymer chains to orient in the shear direction. Such anisotropic properties are manifested at a temperature at which the wholly aromatic polyester readily undergoes melt processing to form shaped articles. The anisotropic properties may be confirmed by conventional polarized light techniques whereby crossed-polarizers are utilized. More specifically, the anisotropic melt phase may conveniently be confirmed by the use of a Leitz polarizing microscope at a magnification of 40× with the sample on a Koffler hot stage and under a nitrogen atmosphere. The melt phases of the wholly aromatic polyesters which are suitable for use in the present invention are optically anisotropic, i.e., they transmit light when examined between crossed-polarizers. By contrast, the melt of a conventional polymer will not transmit appreciable light when placed between crossed-polarizers.

The most preferred liquid crystalline polyester blocks are derived from Ekonol and Ekkcel, and those incorporating units from (22) and (23).

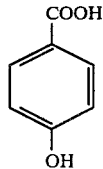
(22)

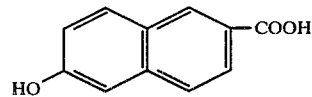
(23)

The block copolymers of the present invention are prepared using hydroxyl-terminated poly(aryl ether ketone) oligomers and the appropriate liquid crystal polyester monomers under typical polyester forming conditions. The methods are outlined in the Schemes (I)–(III); the symbol $HOE_1(E_2COE_3O)_nE_4OH$ represents a hydroxyl-terminated poly(aryl ether ketone) oligomer wherein $E_1$, $E_2$, $E_3$ and $E_4$ represent a divalent aromatic radical such as p-phenylene, diphenyl ether 4,4'-diyl, and the like, and n is such that its number average molecular weight is at least 500, preferably at least 1,500, and most preferably at least 2,000.

SCHEME I

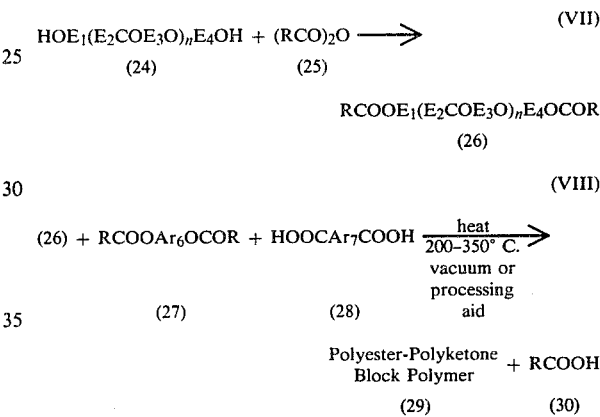

The groups $Ar_6$ and $Ar_7$ are divalent aromatic radicals which are residues of diphenols and diacids that are suitable components for the liquid crystalline polyester blocks. The method depicted above consists in first preparing an ester of the hydroxyl-containing reactants with a lower mono-carboxylic acid, RCOOH wherein R is a $C_1$ to $C_4$ alkyl radical or a phenyl radical. These esters are then reacted under acidolysis conditions with the acid containing reactants to yield the block copolymer and the lower monocarboxylic acid which can be recycled. The two steps, i.e., the preparation of the monocarboxylic acid esters of the phenolic reactants and their polymerization can be performed separately, or in a one-pot procedure. the acidolysis reaction can be performed in bulk or in the presence of from about 10 to about 60, more preferably, from about 25 to about 60, and most preferably, from about 30 to about 60 weight percent, based on the weight of the block copolymer produced, of a processing aid. The preferred processing acids are a diphenyl ether compound as described in U.S. Pat. Nos. 4,294,956 and 4,296,232; a cycloaliphatic substituted aromatic or heteroaromatic compound, as described in U.S. Pat. No. 4,294,957; and a halogenated and/or etherated substituted aromatic or heteroaromatic compound as described in U.S. Pat. No. 4,374,239. The polymerization reaction can also be conducted using a slurry process as described in U.S. Pat. No. 4,083,829.

The lower monocarboxylic acid RCOOH is preferably acetic acid. The acidolysis reaction is preferably carried out within the temperature range of from about 200° to about 350° C. However, lower and higher temperatures may also be used. Also, if necessary, the molecular weights of the copolymers can be further advanced using solid state polymerization techniques such as described, for example, in U.S. Pat. Nos. 3,684,766, 3,780,148, 4,075,173, and 4,314,051. The reaction can be carried out at atmospheric, or subatmospheric pressures; it can also be performed under pressures higher than atmospheric.

The acidolysis reaction generally does not require a catalyst. In some instances, however, the use of an appropriate catalyst may prove advantageous. Typical catalysts include dialkyl tin oxide (e.g., dibutyl tin oxide), diaryl tin oxide, titanium dioxide, antimony trioxide, alkoxy titanium silicates, titanium alkoxides, alkali and alkaline earth metal salts of carboxylic acids (e.g., zinc acetate), the gaseous acid catalysts, such as Lewis acids (e.g., $BF_3$), hydrogen halides (e.g., HCl), etc. The quantity of catalyst utilized typically is about 0.001 to 1 percent by weight based upon the total monomer weight, and most commonly about 0.01 to 0.2 percent by weight.

SCHEME II

In this scheme the acid-containing monomers are first transformed into the corresponding diaryl esters. The latter are then submitted to an ester-exchange reaction as shown in the equation below. The two steps can be performed separately or in a one-pot procedure.

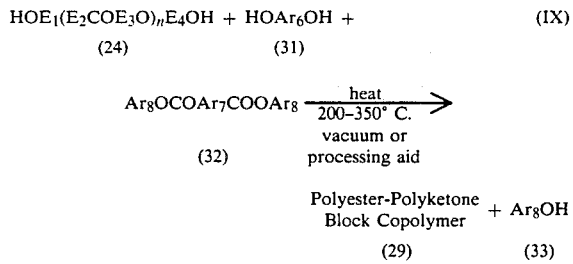

The groups $Ar_6$ and $Ar_7$ are divalent aromatic radicals as defined above; $Ar_8$ is a monovalent aromatic group, preferably phenyl or tolyl. The reaction can be performed in bulk or in the presence of from about 10 to about 60, more preferably from about 25 to about 60, and most preferably, from about 30 to about 60 weight percent, based on the weight of the block copolymer produced, of a processing aid. The preferred processing aids are a diphenyl ether compound, a cycloaliphatic substituted aromatic or heteroaromatic compound, or a halogenated and/or etherated substituted aromatic or heteroaromatic compound as described in, for example, U.S. Pat. No. 4,459,384.

Preferably, phenyl esters of the carboxylic acids are used. The ester-exchange reaction is generally carried out in the temperature range of about 200° to about 350° C. However, lower and higher temperatures can also be used. If necessary, the molecular weights of the block copolymers can be further advanced using solid state techniques, vide ultra. The reaction can be performed at atmospheric, reduced, or higher than atmospheric pressures. Catalysts such as, for example, alkali metal phenoxides, may be used to accelerate the polymerization.

SCHEME III

In this scheme the acid function is first transformed into the corresponding acid chloride which is then condensed with the phenolic reactant to high polymer. The polymerization is illustrated in equation (X).

$$HOE_1(E_2COE_3O)_nE_4OH + HOAr_6OH + \quad (X)$$
$$(24) \quad\quad\quad (31)$$

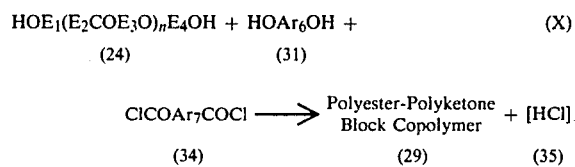

The condensation depicted in the equation above can be performed in a variety of ways. Thus, it can be carried out via the interfacial technique, as described by P. W. Morgan in "Condensation Polymers by Interfacial and Solution Methods", Interscience, New York, 1965. The interfacial method, however, is rather of limited usefulness, due to the generally low solubility both of the hydroxyl-terminated oligomers (24) and of the final block copolymers. Hence, relatively low molecular weights are obtained via this route.

It is, thus, more advantageous to carry out the polycondensation in a high boiling solvent as described, for example, in U.S. Pat. Nos. 3,733,306 and 3,160,602. Typical solvents useful for this type of polymerization are, for example, the chlorinated aromatic hydrocarbons such as chlorobenzene, dichloro-, trichloro-, and tetrachlorobenzenes, chlorinated diphenyls or diphenyl ethers, chlorinated naphthalenes, as well as nonchlorinated aromatics such as terphenyl, benzophenone, dibenzylbenzenes, and the like. The reaction can be run with or without catalysts. Typical catalysts are metallic magnesium, as described in U.S. Pat. No. 3,733,306, tetravalent titanium esters, as described in German Patent Application Ser. No. 1,933,687, and the like.

Among the three types of processes, those following Schemes I and II are preferred. The process of Scheme I is most preferred.

The preparation of the poly(aryl ether ketone) oligomers (24) via the electrophilic

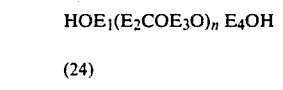

(24)

Friedel-Crafts polycondensation was described above. where the nucleophilic route is used, an excess of the diphenol component is reacted with the activated aromatic dihaloderivative. The higher the excess of the diphenol, the lower the molecular weight of the oligomer (24). In another embodiment, a halophenol is reacted with itself, also via the nucleophilic route, till the appropriate viscosity (molecular weight) is reached. The chloro-hydroxy oligomer resulting from the self-condensation, is then reacted in the presence of base with a small amount of a diphenol to ensure dihydroxy-termination.

The number average molecular weight of the liquid crystalline polyester blocks in the block polymers of the instant invention should be at least 500, preferably at least 1,500, and most preferably, at least 2,000.

The weight ratio of the components, i.e., the ratio poly(aryl ether ketone):liquid crystalline polyester may be within the range of 1:9 to 9:1. It is preferably in the range of 2:8 to 8:2, and most preferably in the range of 25:75 to 75:25.

The polymers of the instant invention have a reduced viscosity (RV) of at least 0.55 dl/g as measured in an appropriate solvent. Depending on the type of blocks and on the composition of the block polymer a variety of solvents may be used for the determination of the RV. These solvents are, for example, $CH_2Cl_2$, $CHCl_3$, phenol-tetrachloroethane mixtures, N-methylpyrrolidone, pentafluorophenol, concentrated sulfuric acid, diphenyl sulfone, ditolyl sulfone, and the like.

The polymers of this invention may include mineral fillers such as carbonates including chalk, calcite and dolomite; silicates including mica, talc, wollastonite; silicon dioxide; glass spheres; glass powders; aluminum; clay; quartz; and the like. Also, reinforcing fibers such as fiberglass, carbon fibers, and the like may be used. The polymers may also include additives such as titanium dioxide; thermal stabilizers, ultraviolet light stabilizers, plasticizers, and the like.

The polymers of this invention may be fabricated into any desired shape, i.e., moldings, coatings, films, or fibers. They are particularly desirable for molding, for fiber, and for use as electrical insulation for electrical conductors.

Also, the polymers may be woven into monofilament threads which are then formed into industrial fabrics by methods well known in the art as exemplified by U.S. Pat. No. 4,359,501. Further, the polymers may be used to mold gears, bearings and the like.

EXAMPLES

The following examples serve to give specific illustrations of the practice of this invention but they are not intended in any way to limit the scope of this invention.

270° C. for 2 hours. The reaction mixture is poured from the reaction flask, cooled, ground to a fine powder, and a sample refluxed successively twice with acetone, once with 2% hydrochloric acid, once with water, and washed thoroughly with acetone. it is then dried till constant weight at 120° C. under vacuum (~20 mm). Based on reactant stoichiometry this oligomer has the structure (36) as depicted above.

Its molecular weight is found to be higher than 1,500.

EXAMPLE 2

A 2,000 ml flask was fitted with a mechanical stirrer, nitrogen sparge tube, thermometer, reflux condenser and gas outlet connected to an aqueous sodium hydroxide trap. The apparatus was purged with nitrogen and while under a positive pressure was charged with 1400 ml of 1,2-dichloroethane, 2.03 g (0.010 moles) of isophthaloyl chloride, 38.57 g (0.190 moles) of terephthaloyl chloride, 35.74 g (0.210 moles) of diphenylether and 3.17 g (0.020 moles) of p-fluorobenzoyl chloride. The mixture was cooled to 0° C. as 12.80 g (0.546 moles) of aluminum trichloride was added at a rate such as not to exceed 5° C. After 6 hours at 0° C., the heterogeneous slurry was allowed to warm to room temperature (about 25° C.) and stirred for an additional 17 hours. The excess solvent was decanted and the precipitate was added to dilute aqueous acid (3,000 ml $H_2O$/100 ml conc. hydrochloric acid) and heated to reflux for 2 hours while the 1,2-dichloroethane was continuously removed. The polymer was filtered and dried in a vacuum at 60° C. for 24 hours to give 60.2 grams of the final polymer having a general structure as shown in formula (37). The polymer had a reduced viscosity of 0.34 dl/g as measured in sulfuric acid at a concentration of 1 g/100 ml at 25° C.

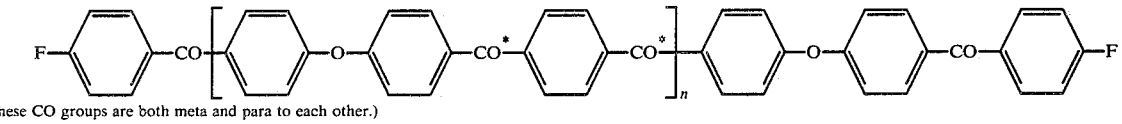

(*these CO groups are both meta and para to each other.)

EXAMPLE 1

Preparation of Hydroxyl-terminated Oligomer (36)

The molecular weight of the oligomer (37) was about 6,300.

Hydrolysis of (37) in the presence of base, at about

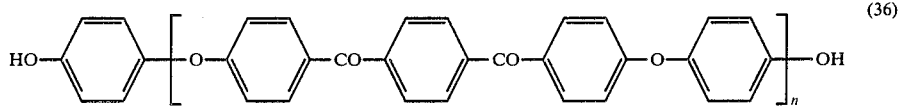

(36)

A 250 ml. 3-neck flask with slanted side arms fitted with a Claisen arm, nitrogen inlet tube, thermocouple probe, condenser, and stainless steel stirrer is charged with 1,4-bis(p-fluorobenzoyl)benzene (0.1104 moles, 35.58 gm), hydroquinone (0.115 moles, 12.66 gm), sodium carbonate (0.1173 moles, 12.43 gm; ground and dried), anhydrous potassium fluoride (0.0293 moles, 1.70 gm) and diphenyl sulfone (100 gm). The apparatus is evacuated and filled with argon by means of a Firestone valve connected to the top of the condenser. A flow of high purity nitrogen is started and the connection to the Firestone valve is replaced with a bubbler. The contents of the flask are heated carefully by means of a heating mantle and temperature controller to melt the diphenyl sulfone. The reaction mixture is stirred and heated to 200° C. and held 30 minutes at that temperature; it is then held at 250° C. for 1 hr., and finally at 180°–200° C., in sulfolane or diphenyl sulfone yields the corresponding dihydroxy end-capped oligomer (38) in a quantitative yield.

EXAMPLE 3

A 1,000 ml flask was fitted with a mechanical stirrer, reflux condenser, thermometer, nitrogen sparge tube, and gas outlet connected to an aqueous sodium hydroxide trap. The apparatus was purged with nitrogen and while under a positive pressure was charged with 85.11 g (0.500 moles) of diphenylether, 68.01 g (0.335 moles) of terephthaloyl chloride, 53.12 g (0.335 moles) of p-fluorobenzoyl chloride and 600 mls of 1,2-dichloroethane. The mixture was cooled to 0° C. as 174.21 g (1.31 moles) of aluminum trichloride was added at a rate such as not to exceed 5° C. After 6 hours at 0° C. the viscous homogeneous mixture was allowed to warm to room temperature and stirring was continued for an additional 17 hours. The entire mixture was then poured into dilute aqueous acid (3,000 ml of H$_2$O/100 ml conc. hydrochloric acid), refluxed with continuous removal of 1,2-dichloroethane and filtered. The precipitate was refluxed in 5% hydrochloric acid (700 ml), filtered, washed at room temperature with distilled water (2 times using 500 ml) and methanol (2 times using 500 ml) and dried in a vacuum at 100° C. for 24 hours. The final oligomeric crystalline poly(aryletherketone) had the structural formula (37), although without any meta linkages, and wherein the value of n was about 2 (mol. wt. ~1,015). The oligomer was characterized by $^{13}$C NMR, by mass spectroscopy and elemental analysis.

Hydrolysis, using conditions similar to those in Example 2, yields the dihydroxy end-capped oligomer (39) in a quantitative yield.

PREPARATION OF THE DIACETATES OF THE HYDROXYL-TERMINATED OLIGOMERS

General Procedure

Into a glass lined reactor are charged about 800 gms of the oligomer and 2,000 grams of acetic anhydride. The mixture is heated to about 135° C. and held at this temperature for about 24 hours. Vacuum is then slowly applied to distill acetic acid and excess acetic anhydride. At maximum vacuum (~2 mm), the material temperature is allowed to rise to about 150° C. and held until no further distillation is evident (approximately 30 to 50 minutes). Analysis of the crude product shows that the conversion of the oligomer to the diacetate is 99.9% complete. The material also contains some residual acetic anhydride (usually less than about 1,000 ppm based on the weight of the oligomer diacetate as measured by titration with morpholine as described in Siggia and Hana, "Quantitative Organic Analysis via Functional Groups", Fourth Edition, Wiley-Interscience, 1979, pages 231 to 235).

Due to the rather limited solubility of the poly(aryl ether ketone) oligomers it is often necessary to use a co-solvent during the preparation of the diacetates. Typical cosolvents that may be used are diphenyl ether, substituted diphenyl ethers, chlorinated aromatic hydrocarbons, alkoxy-substituted (chlorinated) aromatic hydrocarbons, and the like. In some instances, one may also use typical aprotic solvents, i.e., dimethyl sulfone, diphenyl sulfone, N-methylpyrrolidone, etc. . . . These solvents must be used with care, however, as undesirable side reactions (e.g., acylation) may take place.

The diacetates obtained after the evaporation of the acetic anhydride and optionally the solvent, can be used without any further purification for the preparation of the poly (ether ketone)-liquid crystalline polyester block copolymers.

POLYMERIZATION VIA THE DIACETATE ROUTE

General Procedure

The crude diacetate and the appropriate liquid crystal polyester forming reactants are placed into a reactor. About 40 wt. percent, based on the block copolymer to be produced, of an appropriate processing aid are also charged into the reactor. The system is purged with nitrogen for about 20 minutes and then the heat is turned on to raise the temperature of the reactor to about 270° C. Acetic acid starts to distill when the temperature of the mixture reaches about 255° C. Acetic acid distillation is followed by measuring its level in the receiver. After about 3.5 to 5 hrs. at 270°–350° C. the power draw on the agitator begins to increase which indicates a viscosity increase. The reaction is generally terminated after about 7 to 10 hours. If necessary, the polymer molecular weight can be increased further using solid-state polymerization techniques, vide ultra. The polymer can be isolated by either solvent evaporation using, for example, a twin-screw extruder; it can also be precipitated by coagulation in a non-solvent, e.g., alcohol, acetone, and the like. The reaction mixture may also be diluted with a good solvent, filtered either directly or after treatment with an absorbent such as charcoal, and the polymer then isolated by the methods outlined above.

It is to be noted that the preparation of the block copolymers via the ester-exchange route follows a procedure very much similar to that outlined above for the acidolysis polymerization.

Table I lists the polymers that are prepared. They show excellent mechanical and thermal stability properties. Their solvent and chemical resistance are outstanding.

TABLE I

| Oligomer No. | Liquid Crystal Polyester Reactant(s) (mole ratio) | | Weight ratio of blocks [Poly(aryl ether ketone)/polyester] |
|---|---|---|---|
| (36) | HO—⟨⟩—COOH + HO—⟨⟨⟩⟩—COOH | (75:25) | 1:1 |
| (36) | HOOC—⟨⟩—OH | | 6:4 |
| (36) | HOOC—⟨⟩—OH + ⟨⟩(COOH)(COOH) + | (1:0.2:0.8:1.00) | 8:2 |

TABLE I-continued

| Oligomer No. | Liquid Crystal Polyester Reactant(s) (mole ratio) | | Weight ratio of blocks [Poly(aryl ether ketone)/polyester] |
|---|---|---|---|
| (36) | [benzene-1,3-dicarboxylic acid + 4,4'-dihydroxybiphenyl] | | |
| (38) | [HOOC–C6H4–COOH + HO–C6H3(C6H5)–OH + 6-hydroxy-2-naphthoic acid (with COOH)] | (0.5:1.00:0.5) | 1:1 |
| | [HO–C6H4–COOH + 6-hydroxy-2-naphthoic acid] | (75:25) | 3:7 |
| (39) | [HO–C6H4–COOH + 6-hydroxy-2-naphthoic acid] | (75:25) | 1:1 |

Note: In all of the polymerizations above, a small additional amount of terephthalic acid, equivalent to the amount of the oligomer, is used.

What is claimed is:

1. A process for preparing a block copolymer comprising a poly(aryl ether ketone) oligomer block and a liquid crystalline polyester block which comprises the following steps:
   (a) reacting the dihydroxy terminated oligomer HO-$E_1(E_2COE_3O)_nE_4$OH with an anhydride of a lower carboxylic acid $(RCO)_2O$ to form the diester $RCOOE_1(E_2COE_3O)_nE_4OCOR$,
   (b) reacting the product from (a) with the diester $RCOOAr_6OCOR$ and the dicarboxylic acid HOOC$Ar_7$COOH under acidolysis conditions, and
   (c) recovering the block copolymer, and wherein $E_1$, $E_2$, $E_3$ and $E_4$ are divalent aromatic radicals, R is $C_1$ to $C_4$ alkyl or phenyl, n is such that the molecular weight of the poly(aryl ether ketone) block is at least 500, and $Ar_6$ and $Ar_7$ are divalent aromatic radicals.

2. A process as defined in claim 1 wherein R is methyl.

3. A process as defined in claim 1 wherein steps (a) and (b) are preformed in a one-pot operation.

4. A process as defined in claim 1 wherein step (b) is carreid out at a temperature of from about 200° to 350° C.

5. A process as defined in claim 1 wherein the molecular weight is advanced by further solid state polymerization.

6. A process as defined in claim 1 wherein step (b) is carried out in the presence of a processing aid.

7. A process as defined in claim 1 wherein step (b) is carried out in the presence of a catalyst.

8. A process as defined in claim 7 wherein the catalyst is selected from dialkyl tin oxide, diaryl tin oxide, titanium dioxide, antimony trioxide, alkoxy titanium silicates, titanium alkoxides, alkali and alkaline earth metal salts of carboxylic acids, Lewis acids, and hydrogen halides.

9. A process as defined in claim 8 wherein the catalyst is used in amounts of from about 0.001 to about 1 percent by weight based upon the total monomer weight.

10. A process as defined in claim 1 wherein the lower carboxylic acid diester $RCOOE_1(E_2COE_3O)_nE_4OCOR_1$ is prepared by heating the dihydroxy compound $HOE_1(E_2COE_3O)_nE_4$OH with the anhydride $(RCO)_2O$ in the presence of a cosolvent.

11. A process as defined in claim 10 wherein the cosolvent is selected from diphenyl ether, substituted diphenyl ether, chlorinated aromatic hydrocarbons, and alkoxy-substituted (chlorinated) aromatic hydrocarbons.

12. A process for preparing a block copolymer comprising a poly(aryl ether ketone) block and a liquid crystalline polyester block which comprises the following steps:
   (a) reacting the dihydroxy-terminated oligomer HO-$E_1(E_2COE_3O)_nE_4$OH with the diphenol HOAr$_6$OH and the diaryl ester $Ar_8OCOAr_7COOAr_8$ at a temperature of from about 200° to 350° C., and
   (b) recovering the block copolymer, and wherein $E_1$, $E_2$, $E_3$ and $E_4$ are divalent aromatic radicals, n is such that the molecular weight of the poly(aryl ether ketone) block is at least 500, $Ar_6$ and $Ar_7$ are divalent aromatic radicals and $Ar_8$ is a monovalent aromatic radical.

13. A process as defined in claim 12 wherein the process is performed in a one-pot operation.

14. A process as defined in claim 12 wherein $Ar_8$ is phenyl.

15. A process as defined in claim 12 wherein the molecular weight is advanced by solid state polymerization.

16. A process as defined in claim 12 which is carried out in the presence of a catalyst.

17. A process as defined in claim 16 wherein the catalyst is an alkali metal phenoxide.

18. A process as defined in claim 12 which is carried out in the presence of a processing aid.

19. A process for preparing a block copolymer comprising a poly(aryl ether ketone) oligomer block and a liquid crystalline polyester block which comprises the following steps:
(a) reacting the dihydroxy-terminated oligomer HO-$E_1(E_2COE_3O)_nE_4$OH with the diphenol HOAr$_6$OH and the diacid chloride ClCOAr$_7$COCl, and
(b) recovering the block copolymer, and wherein $E_1$, $E_2$, $E_3$ and $E_4$ are divalent aromatic radicals, n is such that the molecular weight of the poly(aryl ether ketone) is at least 500 and Ar$_6$ and Ar$_7$ are divalent aromatic radicals.

20. A process as defined in claim 19 which is carried out by an interfacial method.

21. A process as defined in claim 19 which is carried out in a high boiling solvent.

22. A process as defined in claim 21 wherein the high boiling solvent is selected from chlorinated aromatic hydrocarbons, chlorinated diphenyls, diphenyl esters, chlorinated naphthalenes or nonchlorinated aromatics.

23. A process as defined in claim 19 which is carried out in the presence of a catalyst.

24. A process as defined in claim 23 wherein the catalyst is metallic magnesium or a tetravalent titanium ester.

* * * * *

UNITED STATES PATENT OFFICE
CERTIFICATE OF CORRECTION

Patent No. 4,668,744     Dated May 26, 1987

Inventor(s)   MARKUS MATZNER AND DONALD M. PAPUGA

It is certified that error appears in the above-identified patent and that said Letters Patent are hereby corrected as shown below:

PATENT

| Column | Line | |
|---|---|---|
| 14 | 62 | "2,6-dhydroxy" should read ---2,6-dihydroxy---. |
| 19-20 | 36-44 | The long formula should be designated at "(37)". |

Signed and Sealed this

Sixth Day of October, 1987

Attest:

Attesting Officer

DONALD J. QUIGG

Commissioner of Patents and Trademarks